(12) United States Patent
Boss et al.

(10) Patent No.: US 9,218,196 B2
(45) Date of Patent: Dec. 22, 2015

(54) PERFORMING PRE-STAGE REPLICATION OF DATA ASSOCIATED WITH VIRTUAL MACHINES PRIOR TO MIGRATION OF VIRTUAL MACHINES BASED ON RESOURCE USAGE

(75) Inventors: Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/473,664

(22) Filed: May 17, 2012

(65) Prior Publication Data

US 2013/0311988 A1    Nov. 21, 2013

(51) Int. Cl.
*G06F 9/455* (2006.01)
*G06F 9/48* (2006.01)

(52) U.S. Cl.
CPC .......... *G06F 9/45558* (2013.01); *G06F 9/4862* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2005/0268298 | A1* | 12/2005 | Hunt et al. | 718/1 |
| 2006/0069761 | A1* | 3/2006 | Singh et al. | 709/222 |
| 2008/0104587 | A1* | 5/2008 | Magenheimer et al. | 718/1 |
| 2009/0007106 | A1* | 1/2009 | Araujo et al. | 718/1 |
| 2010/0131624 | A1* | 5/2010 | Ferris | 709/221 |
| 2010/0169253 | A1* | 7/2010 | Tan | 706/21 |
| 2010/0306767 | A1 | 12/2010 | Dehaan | |
| 2010/0332889 | A1* | 12/2010 | Shneorson et al. | 714/2 |
| 2011/0055377 | A1 | 3/2011 | Dehaan | |
| 2011/0075667 | A1 | 3/2011 | Li et al. | |
| 2011/0219372 | A1 | 9/2011 | Agrawal et al. | |
| 2011/0246992 | A1 | 10/2011 | Kern | |
| 2012/0137287 | A1* | 5/2012 | Pang et al. | 718/1 |
| 2012/0304175 | A1* | 11/2012 | Damola et al. | 718/1 |
| 2013/0014103 | A1* | 1/2013 | Reuther et al. | 718/1 |

OTHER PUBLICATIONS

Maitland, J., "Keeping Control Isn't Easy", Chapter 4: Cloud-Based Infrastructure, SearchCloudComputing.com, 13 pages, Oct. 2009.

(Continued)

*Primary Examiner* — Mengyao Zhe
*Assistant Examiner* — James J Lee
(74) *Attorney, Agent, or Firm* — Noah A. Sharkan; Hunter E. Webb; Keohane & D'Alessandro PLLC

(57) ABSTRACT

Embodiments of the present invention relate to the migration of virtual machines (VMs) between networked computing environments (e.g., cloud computing environments) based on resource utilization. Specifically, embodiments of the present invention provide an approach to select an optimal set (one or more) of VMs as candidates for pre-staged migration. In a typical embodiment, when a first cloud environment nears physical resource capacity, an optimal set of VMs will be identified for migration to a second cloud environment that has sufficient capacity to accommodate workload(s) from the first cloud environment. To make this process more efficient, data associated with the set of virtual machines may be "pre-stage" replicated from the first cloud environment to the second cloud environment (e.g., in advance of the migration of the identified set of VMs).

22 Claims, 5 Drawing Sheets

(56) References Cited

OTHER PUBLICATIONS

Mell, R et al., "The NIST Definition of Cloud Computing", National Institute of Standards and Technology, Information Technology Laboratory, Version 15, Oct. 7, 2009, 2 pages.

Wood, T. et al., "CloudNet: Dynamic Pooling of Cloud Resources by Live WAN Migration of Virtual Machines", University of Massachusetts Amherst, Mar. 9, 2011, 12 pages.

Das, S. et al., "Faster and Efficient VM Migrations for Improving SLA and ROI in Cloud Infrastructures", Mellanox Technologies, 7 pages. No publication date stated, 2010.

Xu, Y. et al., "Scheme of Resource Optimization using VM Migration for Federated Cloud", 32nd Asia-Pacific Advanced Network Meeting, 2011, 9 pages.

"Virtual Machine Mobility with VMware VMotion and Cisco Data Center Interconnect Technologies", Cisco & VMware, 2009, 17 pages. No authors cited.

Maitland, J., "Keeping Control Isn't Easy", Chapter 4: Cloud-Based Infrastructure, SearchCloudComputing.com, Publication Date: Oct. 2009, 19 pages.

Das, S. et al., "Faster and Efficient VM Migrations for Improving SLA and ROI in Cloud Infrastructures", Mellanox Technologies, DC CAVES (2010), 7 pages.

\* cited by examiner

PERFORMING PRE-STAGE REPLICATION OF DATA ASSOCIATED WITH VIRTUAL MACHINES PRIOR TO MIGRATION OF VIRTUAL MACHINES BASED ON RESOURCE USAGE

TECHNICAL FIELD

In general, embodiments of the present invention relate to virtual machine migration. Specifically, embodiments of the present invention relate to the migration of virtual machines between networked computing environments (e.g., cloud computing environments) based on resource utilization.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Many networked computing services (e.g., cloud computing services) are provided through infrastructure provisioning (e.g., within a relatively static hardware pool) whereby operating systems and computer software applications can be deployed and reconfigured. In a typical cloud computing environment, application images can be installed and overwritten, Internet Protocol (IP) addresses can be modified, and real and virtual processors are allocated to meet changing resource requirements. As cloud environments receive and process workloads, however, challenges may exist in migrating one or more of such workloads between geographically dispersed cloud environments in a time-efficient manner. As such, workloads may not be processed in an optimal fashion.

SUMMARY

In general, embodiments of the present invention relate to the migration of virtual machines (VMs) between networked computing environments (e.g., cloud computing environments) based on resource utilization. Specifically, embodiments of the present invention provide an approach to select an optimal set (one or more) of VMs as candidates for pre-staged migration. In a typical embodiment, when a first cloud environment nears physical resource capacity, an optimal set of VMs will be identified for migration to a second cloud environment that has sufficient capacity to accommodate workload(s) from the first cloud environment. To make this process more efficient, data associated with the set of virtual machines may be "pre-stage" replicated from the first cloud environment to the second cloud environment (e.g., in advance of the migration of the identified set of VMs).

A first aspect of the present invention provides a computer-implemented method for migrating virtual machines between networked computing environments, comprising: determining that resource usage in a first networked computing environment is approaching a predetermined level; identifying a set of virtual machines in the first networked computing environment as a candidate for migration to a second networked computing environment, the identifying being based upon at least one of the following: a size of data associated with each of the set of virtual machines, a frequency of change of the data associated with each of the set of virtual machines, a lifecycle of each of the set of virtual machines, or a level of usage of each of the set of virtual machines; performing a pre-stage replication of the data associated with the set of virtual machines to the second networked computing environment; migrating at least one virtual machine of the set of virtual machines from the first networked computing environment to the second networked computing environment; and associating, responsive to the migrating, the data with the at least one virtual machine.

A second aspect of the present invention provides a system for migrating virtual machines between networked computing environments, comprising: a memory medium comprising instructions; a bus coupled to the memory medium; and a processor coupled to the bus that when executing the instructions causes the system to: determine that resource usage in a first networked computing environment is approaching a predetermined level; identify a set of virtual machines in the first networked computing environment as a candidate for migration to a second networked computing environment, the identifying being based upon at least one of the following: a size of data associated with each of the set of virtual machines, a frequency of change of the data associated with each of the set of virtual machines, a lifecycle of each of the set of virtual machines, or a level of usage of each of the set of virtual machines; perform a pre-stage replication of the data associated with the set of virtual machines to the second networked computing environment; migrate at least one virtual machine of the set of virtual machines from the first networked computing environment to the second networked computing environment; and associate, responsive to the migration, the data with the at least one virtual machine.

A third aspect of the present invention provides a computer program product for migrating virtual machines between networked computing environments, the computer program product comprising a computer readable storage media, and program instructions stored on the computer readable storage media, to: determine that resource usage in a first networked computing environment is approaching a predetermined level; identify a set of virtual machines in the first networked computing environment as a candidate for migration to a second networked computing environment, the identifying being based upon at least one of the following: a size of data associated with each of the set of virtual machines, a frequency of change of the data associated with each of the set of virtual machines, a lifecycle of each of the set of virtual machines, or a level of usage of each of the set of virtual machines; perform a pre-stage replication of the data associated with the set of virtual machines to the second networked computing environment; migrate at least one virtual machine of the set of virtual machines from the first networked computing environment to the second networked computing environment; and associate, responsive to the migration, the data with the at least one virtual machine.

A fourth aspect of the present invention provides a method for deploying a system for migrating virtual machines between networked computing environments, comprising: providing a computer infrastructure being operable to: determine that resource usage in a first networked computing environment is approaching a predetermined level; identify a set of virtual machines in the first networked computing environment as a candidate for migration to a second networked computing environment, the identifying being based upon at least one of the following: a size of data associated with each of the set of virtual machines, a frequency of change of the data associated with each of the set of virtual machines, a lifecycle of each of the set of virtual machines, or a level of usage of each of the set of virtual machines; perform a pre-stage replication of the data associated with the set of virtual machines to the second networked computing environment; migrate at least one virtual machine of the set of virtual machines from the first networked computing environment to the second networked computing environment; and associate, responsive to the migration, the data with the at least one virtual machine.

BRIEF DESCRIPTION OF THE DRAWINGS

These and other features of this invention will be more readily understood from the following detailed description of the various aspects of the invention taken in conjunction with the accompanying drawings in which.

Figure 1:
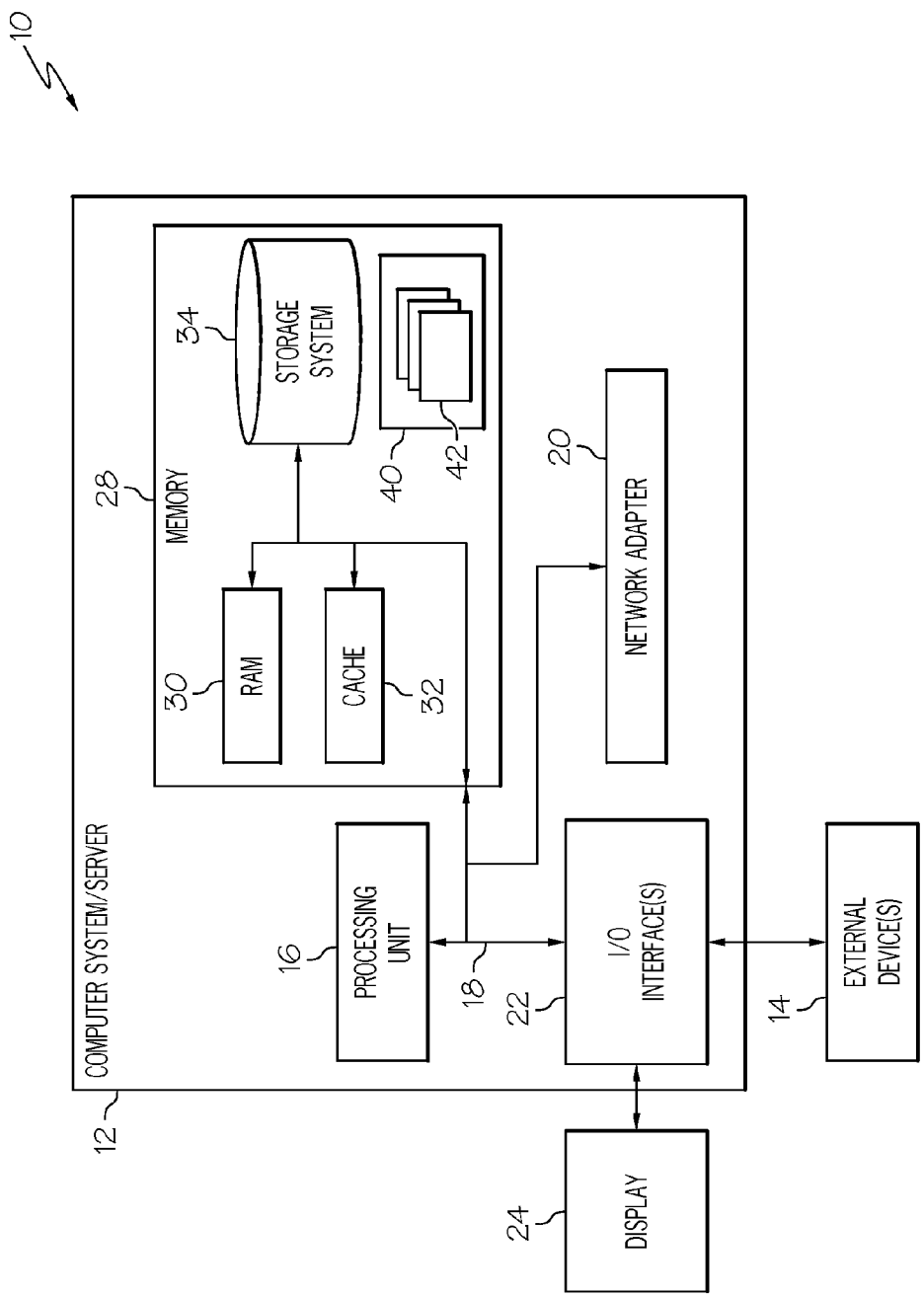
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to the migration of virtual machines (VMs) between networked computing environments (e.g., cloud computing environments) based on resource utilization. Specifically, embodiments of the present invention provide an approach to select an optimal set (one or more) of VMs as candidates for pre-staged migration. In a typical embodiment, when a first cloud environment nears physical resource capacity, an optimal set of VMs will be identified for migration to a second cloud environment that has sufficient capacity to accommodate workload(s) from the first cloud environment. To make this process more efficient, data associated with the set of virtual machines may be "pre-stage" replicated from the first cloud environment to the second cloud environment (e.g., in advance of the migration of the identified set of VMs).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
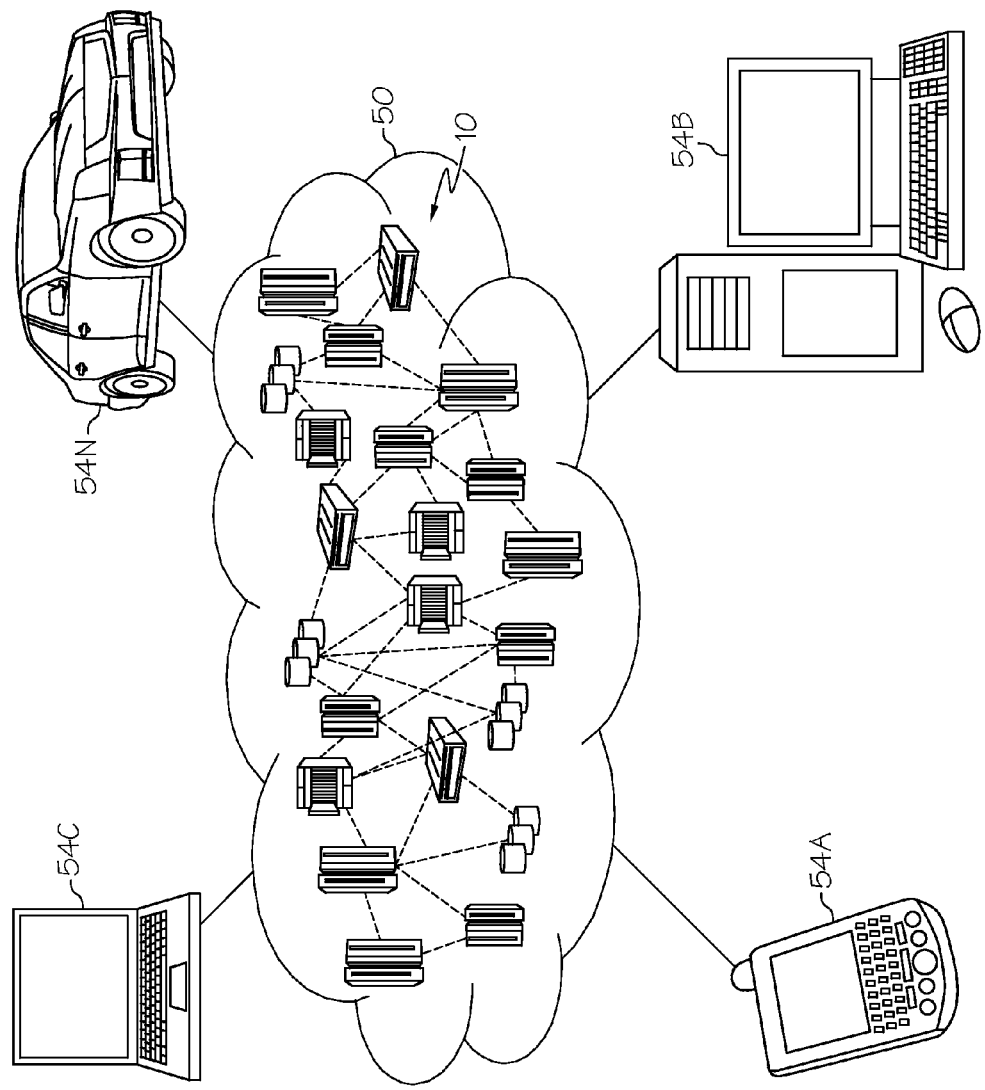
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
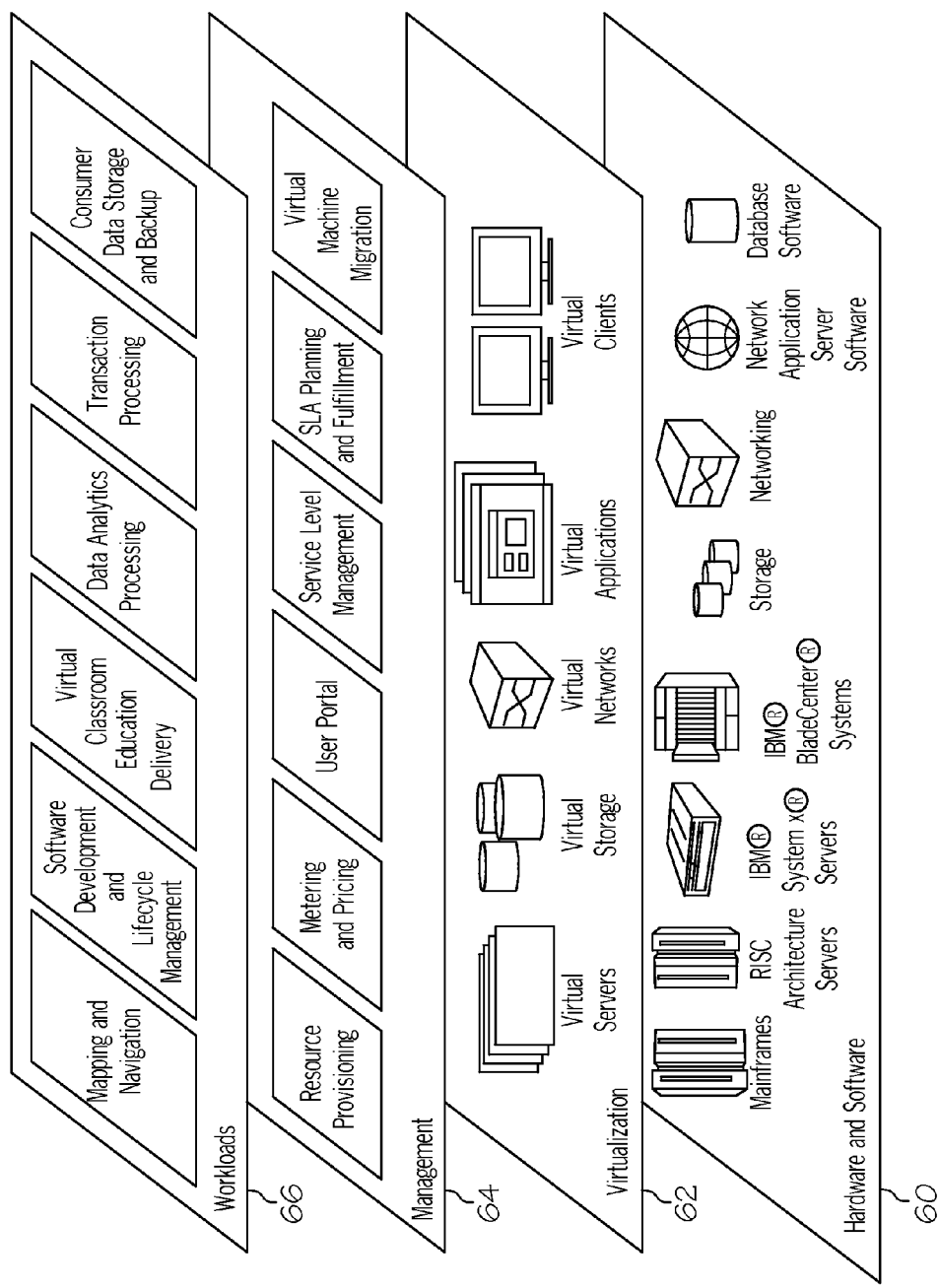
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual machine migration, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine migration functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
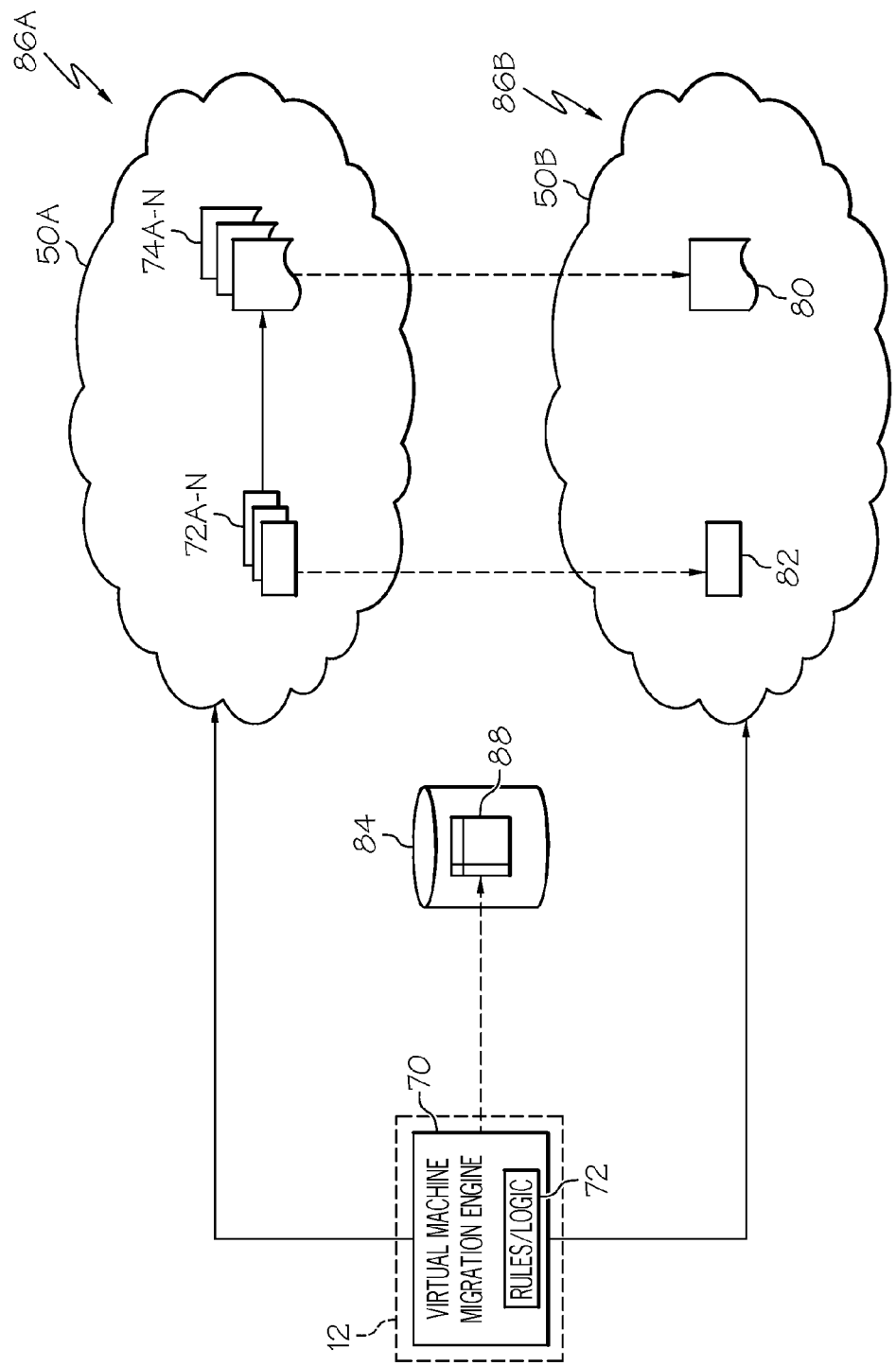
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86A-B (e.g., a cloud computing environment 50A-B). A computer system/server 12, which can be implemented as either a stand-alone computer system or as a networked computer system. In the event the teachings recited herein are practiced in networked computing environment(s) 86A-B, each client need not have a virtual machine migration engine (engine 70). Rather, engine 70 could be loaded on a server or server-capable device that communicates (e.g., wirelessly) with the clients to provide virtual machine migration therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides virtual machine migration hereunder.

Along these lines, engine 70 may perform multiple functions similar to a general-purpose computer. Specifically, among other functions, engine 70 may (among other things): determine that resource usage in a first networked computing environment 86A (e.g., a cloud computing environment 50A) is approaching a predetermined level (e.g., based on a set of workload requests to be processed by the first networked computing environment 86A, which may be predicted based upon historical data 88 stored in a computer storage device 84; identify a set of virtual machines 72A-N in the first networked computing environment 86A as candidates for migration to a second networked computing environment 86B (e.g., a cloud computing environment 50B), the identifying being based upon at least one of the following: a size of data 74A-N associated with each of the set of virtual machines 72A-N, a frequency of change of the data 74A-N associated with each of the set of virtual machines 72A-N, a lifecycle of each of the set of virtual machines 72A-N, a level of usage of each of the set of virtual machines 72A-N, and/or a set of service level agreement (SLA) terms corresponding to the first networked computing environment 86A; perform a pre-stage replication of the data 80 associated with the set of virtual machines 72A-N to the second networked computing environment 86B; migrate at least one virtual machine 82 of the set of virtual machines from the first networked computing environment 86A to the second networked computing environment 86B (e.g., when the resource usage in the first networked computing environment is within a predetermined percentage of a total resource capacity of the first networked computing environment); associate, responsive to the migration, the data 80 with the at least one virtual machine 82; and/or determine a fee for the migration based upon at least one of the following: a quantity of the at least one virtual machines 82 or a size of the data being pre-stage migration 80.

Assume in an illustrative example that cloud environment A has space for 100 virtual machines and is at 90% capacity. Monitoring trends indicate that it will likely run out of resources in seven days. Further assume that cloud environment A sets up an agreement with cloud environment B that allocates 450 gigabytes of storage. Cloud environment A then determines the 15 best candidate virtual machines for pre-stage data migration to cloud environment B. If resources in cloud environment A do become exhausted at the end of seven days, then cloud environment A may migrate workload to cloud environment B. Since most of the data in the 15 virtual machines in cloud environment A have already been mirrored to cloud environment B, cloud environment A may move one or more of those 15 virtual machines to cloud environment B.

As indicated above, various techniques may be utilized to identify candidate virtual machines for migration. These methods are summarized hereinbelow:

Virtual Machine Dataset

This method measures the size of the dataset for each virtual machine. It may be beneficial to select a virtual machine for pre-staging with a smaller dataset compared to other virtual machines. This would represent the smallest amount of data to pre-stage and likely the least cost related to short term storage and network bandwidth. The smaller datasets would also stage faster.

Dataset Change Frequency

This method monitors the number of changes to a dataset for each virtual machine. It may be beneficial to select a virtual machine for pre-staging that contains datasets with the fewest modifications in the data contained therein. This would represent the smallest amount of data that needs to be pre-staged again after an interval or moved during the migration stage described below.

Virtual Machine Lifecycle

This method monitors the virtual machines' lifecycles and selects virtual machines that are more likely to persist for long periods of time. For example, the system may discern that a specific user commonly creates instances that only last for a certain period of time. These virtual machines are less optimal candidates for pre-staging, because when the time for migration occurs, these virtual machines may not exist. In general, the system may select a virtual machine that has existed the longest or a user that historically has provisioned long-lasting virtual machines.

Virtual Machine Usage

This method monitors virtual machine usage and determines which virtual machines have usage trends that may be beneficial for pre-staging or migration. For example, a virtual machine may be tied to a particular operation that only occurs once or several times per day. During other times the virtual machine is mostly idle. Virtual machines with usage patterns may be more optimal pre-stage selections because their migration may be faster as fewer changes may need to be migrated.

In addition to analyzing each virtual machine for the above characteristics, embodiments of the present invention also analyze 'timings' such that the time a pre-stage should occur is also taken into account.

Virtual Machine Timing Migration Selection

This method selects which instances and when those instance should be migrated. Need for selection may be from external pressures or organic growth. For example, consider a cloud environment that is operating at 90% CPU consumption. Monitoring and trending indicate that the CPU consumption on average is growing and that the CPU will be exhausted within three hours. At this point, the proposed invention may begin migrating pre-staged virtual machines.

Illustrative Embodiment

Shown below are illustrative steps according to an embodiment of the present invention:

1. Instance Timing Migration
   A. Monitor cloud environment's unused resources
   B. Monitor Incoming service requests including future reservations and existing projects end dates
   C. Evaluate how much time remaining before the cloud environment runs out of resources
2. Instance Selection—a list may generated of the identified/selected virtual machines instances
   A. For each cloud instance (or group of instances) evaluate:
      1. Data usage patterns
      2. Anticipated life span
      3. Anticipated usage
   B. Sort and prioritize the list based on cloud owners' preferences (time, cost, SLA, etc). (This step may utilize the pre-stage selection methods described above.)
   C. Recommend how many instances from the prioritized list should be migrated in order to alleviate the anticipated cloud resource constraint
   D. Present results (e.g., how much time remaining before the cloud environment runs out of resources)

Cloud Metering/Billing

In another embodiment, a fee may be calculated for the migration. In such an embodiment, cloud environment A may set up an agreement with cloud environment B to allocate a portion of storage. Cloud environment B may, for example, make the pre-allocation free of charge since it means that cloud environment A is more than likely to come to cloud environment B for future workloads since the data is already there. Cloud environment B may charge a nominal fee if resources are scarce in its own data center.

Figure 5:
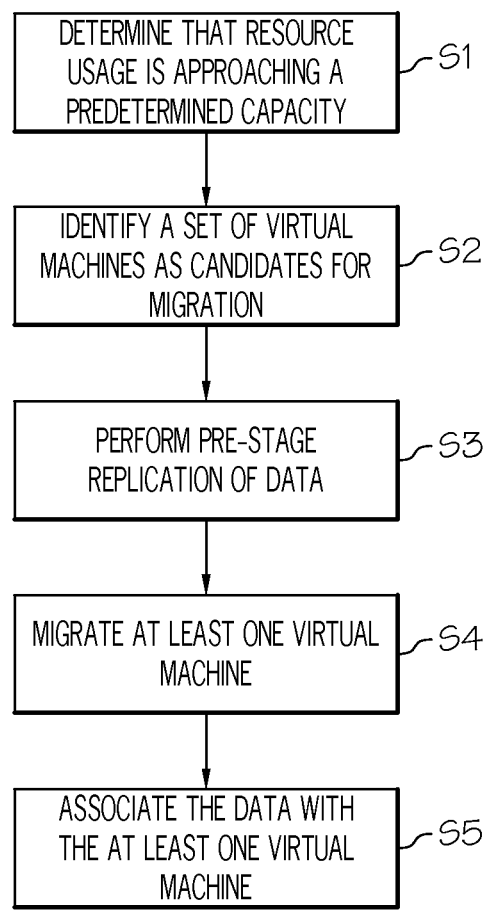
FIG. 5 depicts a method flow diagram according to an embodiment of the present invention.

Shown below are illustrative steps to manage metering (e.g., billing and accounting) once a pre-stage is required according to an embodiment of the present invention:

1. Cloud environment A contacts cloud environment B with a pre-stage transfer request of a number of VMs (each with specific characteristics such as memory, disk, size, etc.)
    A. Cloud environment A optionally attaches an incentive to the request
    B. Cloud environment A sends projected duration and level of commitment needed (best effort, guaranteed, etc.)
2. Cloud environment B evaluates space availability and projected duration against the request
    A. Cloud environment B determines whether to accept the pre-stage
    B. Cloud B determines a time when the pre-staging should take place
    C. Cloud B sends a confirmation to Cloud A to start the pre-staging of identified VMs
    D. Cloud B calculates changes in billing and metering (as Cloud B may have a different rate/billing criteria than Cloud A)
3. Cloud A starts the pre-stage migration once (optionally) confirmation is received from the customer of any rate changes Referring now to FIG. 5, a method flow diagram according to an embodiment of the present invention is shown. As depicted, in first step S1, it is determined that resource usage in a first networked computing environment is approaching a predetermined level. In step S2, a set of virtual machines in the first networked computing environment is identified as a candidate for migration to a second networked computing environment, the identifying being based upon at least one of the following: a size of data associated with each of the set of virtual machines, a frequency of change of the data associated with each of the set of virtual machines, a lifecycle of each of the set of virtual machines, or a level of usage of each of the set of virtual machines. In step S3, pre-stage replication of the data associated with the set of virtual machines to the second networked computing environment is performed. In step S4, at least one virtual machine of the set of virtual machines is migrated from the first networked computing environment to the second networked computing environment. In step S5, the data is associated with the at least one virtual machine.

While shown and described herein as a virtual machine migration solution, it is understood that the invention further provides various alternative embodiments. For example, in one embodiment, the invention provides a computer-readable/useable medium that includes computer program code to enable a computer infrastructure to provide virtual machine migration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide virtual machine migration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual machine migration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for migrating virtual machines between networked computing environments, comprising:
   determining that resource usage of resources of a first networked computing environment by the first networked computing environment is approaching a predetermined level, wherein a determination that the predetermined level is being approached is made when monitoring of the resource usage over time shows a trend that indicates that the predetermined level will be reached within a predetermined period of time;
   identifying a set of virtual machines in the first networked computing environment as a candidate for migration to a second networked computing environment, each virtual machine in the set of virtual machines being identified based upon having at least one of the following criteria relative to non-candidates: a smaller size of data associated with the virtual machine, a lower frequency of change of the data associated with the virtual machine, a longer lifecycle of the virtual machine, or a more predictable pattern level of pattern predictability associated with usage of the virtual machine;
   performing, in response to a determination that the predetermined level is being approached, a pre-stage replication of the data associated with the set of virtual machines identified as the candidate to the second networked computing environment;
   operating, subsequent to the pre-stage replication in response to the determination that the predetermined level is being approached, the set of virtual machines within the first networked computing environment so long as the predetermined level has not been reached;
   migrating, in response to a determination that the predetermined level has been reached, at least one virtual machine of the set of virtual machines from the first networked computing environment to the second networked computing environment; and
   associating, responsive to the migrating, the data with the at least one virtual machine in the second networked computing environment.

2. The computer-implemented method of claim 1, the migrating being performed when the resource usage in the first networked computing environment is within the predetermined level, which is a predetermined percentage of a total resource capacity of the first networked computing environment.

3. The computer-implemented method of claim 1, the determining of whether the predetermined level is being approached being based on a set of workload requests to be processed by the first networked computing environment.

4. The computer-implemented method of claim 3, at least one workload request of the set of workload requests being predicted based upon historical data.

5. The computer-implemented method of claim 1, the set of virtual machines being further identified based on a set of service level agreement (SLA) terms corresponding to the first networked computing environment.

6. The computer-implemented method of claim 1, further comprising determining a fee for the migration based upon at least one of the following: a quantity of the at least one virtual machine, or a size of the data being pre-stage replicated.

7. The computer-implemented method of claim 1, the first networked computing environment comprising a first cloud computing environment, and the second networked computing environment comprising a second cloud computing environment.

8. A system for migrating virtual machines between networked computing environments, comprising:
   a computer readable storage medium that is not a signal, the computer readable storage medium comprising instructions;
   a bus coupled to the computer readable storage medium; and
   a processor coupled to the bus that when executing the instructions causes the system to:
      determine that resource usage of resources of a first networked computing environment by the first networked computing environment is approaching a predetermined level, wherein a determination that the predetermined level is being approached is made when monitoring of the resource usage over time shows a trend that indicates that the predetermined level will be reached within a predetermined period of time;
      identify a set of virtual machines in the first networked computing environment as a candidate for migration to a second networked computing environment, each virtual machine in the set of virtual machines being identified based upon having at least one of the following criteria relative to non-candidates: a smaller size of data associated with the virtual machine, a lower frequency of change of the data associated with the virtual machine, a longer lifecycle of the virtual machine, or a more predictable pattern level of pattern predictability associated with usage of the virtual machine;
      perform, in response to a determination that the predetermined level is being approached, a pre-stage replication of the data associated with the set of virtual machines identified as the candidate to the second networked computing environment;
      operate, subsequent to the pre-stage replication in response to the determination that the predetermined level is being approached, the set of virtual machines within the first networked computing environment so long as the predetermined level has not been reached;
      migrate, in response to a determination that the predetermined level has been reached, at least one virtual machine of the set of virtual machines from the first networked computing environment to the second networked computing environment; and
      associate, responsive to the migration, the data with the at least one virtual machine in the second networked computing environment.

9. The system of claim 8, the migration being performed when the resource usage in the first networked computing environment is within the predetermined level, which is a predetermined percentage of a total resource capacity of the first networked computing environment.

10. The system of claim 8, the determination of whether the predetermined level is being approached being based on a set of workload requests to be processed by the first networked computing environment.

11. The system of claim 10, at least one workload request of the set of workload requests being predicted based upon historical data.

12. The system of claim 8, the set of virtual machines being further identified based on a set of service level agreement (SLA) terms corresponding to the first networked computing environment.

13. The system of claim 8, the computer readable storage medium further comprising instructions for causing the system to determine a fee for the migration based upon at least one of the following: a quantity of the at least one virtual machine, or a size of the data being pre-stage replicated.

14. The system of claim 8, the first networked computing environment comprising a first cloud computing environment, and the second networked computing environment comprising a second cloud computing environment.

15. A computer program product for migrating virtual machines between networked computing environments, the computer program product comprising a computer readable storage medium that is not a signal, and program instructions stored on the computer readable storage medium, wherein the program instructions when executed by a processor causes the processor to:
- determine that resource usage of resources of a first networked computing environment by the first networked computing environment is approaching a predetermined level, wherein a determination that the predetermined level is being approached is made when monitoring of the resource usage over time shows a trend that indicates that the predetermined level will be reached within a predetermined period of time;
- identify a set of virtual machines in the first networked computing environment as a candidate for migration to a second networked computing environment, each virtual machine in the set of virtual machines being identified based upon having at least one of the following criteria relative to non-candidates: a smaller size of data associated with the virtual machine, a lower frequency of change of the data associated with the virtual machine, a longer lifecycle of the virtual machine, or a more predictable pattern level of pattern predictability associated with usage of the virtual machine;
- perform, in response to a determination that the predetermined level is being approached, a pre-stage replication of the data associated with the set of virtual machines identified as the candidate to the second networked computing environment;
- operate, subsequent to the pre-stage replication in response to the determination that the predetermined level is being approached, the set of virtual machines within the first networked computing environment so long as the predetermined level has not been reached;
- migrate, in response to a determination that the predetermined level has been reached, at least one virtual machine of the set of virtual machines from the first networked computing environment to the second networked computing environment; and
- associate, responsive to the migration, the data with the at least one virtual machine in the second networked computing environment.

16. The computer program product of claim 15, the migration being performed when the resource usage in the first networked computing environment is within the predetermined level, which is a predetermined percentage of a total resource capacity of the first networked computing environment.

17. The computer program product of claim 15, the determination of whether the predetermined level is being approached being based on a set of workload requests to be processed by the first networked computing environment.

18. The computer program product of claim 17, at least one workload request of the set of workload requests being predicted based upon historical data.

19. The computer program product of claim 15, the set of virtual machines being further identified based on a set of service level agreement (SLA) terms corresponding to the first networked computing environment.

20. The computer program product of claim 15, the computer readable storage medium further comprising instructions to determine a fee for the migration based upon at least one of the following: a quantity of the at least one virtual machines, or a size of the data being pre-stage replicated.

21. The computer program product of claim 15, the first networked computing environment comprising a first cloud computing environment, and the second networked computing environment comprising a second cloud computing environment.

22. A method for deploying a system for migrating virtual machines between networked computing environments, comprising:
providing a computer infrastructure being operable to:
- determine that resource usage of resources of a first networked computing environment by the first networked computing environment is approaching a predetermined level, wherein a determination that the predetermined level is being approached is made when monitoring of the resource usage over time shows a trend that indicates that the predetermined level will be reached within a predetermined period of time;
- identify a set of virtual machines in the first networked computing environment as a candidate for migration to a second networked computing environment, each virtual machine in the set of virtual machines being identified based upon having at least one of the following criteria relative to non-candidates: a smaller size of data associated with the virtual machine, a lower frequency of change of the data associated with the virtual machine, a longer lifecycle of the virtual machine, or a more predictable pattern level of pattern predictability associated with usage of the virtual machine;
- perform, in response to a determination that the predetermined level is being approached, a pre-stage replication of the data associated with the set of virtual machines identified as the candidate to the second networked computing environment;
- operate, subsequent to the pre-stage replication in response to the determination that the predetermined level is being approached, the set of virtual machines within the first networked computing environment so long as the predetermined level has not been reached;
- migrate, in response to a determination that the predetermined level has been reached, at least one virtual machine of the set of virtual machines from the first networked computing environment to the second networked computing environment; and
- associate, responsive to the migration, the data with the at least one virtual machine in the second networked computing environment.

\* \* \* \* \*